United States Patent [19]
Louviere

[11] Patent Number: 5,775,917
[45] Date of Patent: Jul. 7, 1998

[54] PROPELLER-DRIVEN EDUCATIONAL VEHICLE APPARATUS

[75] Inventor: James P. Louviere, New Iberia, La.

[73] Assignee: Lou-Vee-Air Systems L L C, New Iberia, La.

[21] Appl. No.: 685,515

[22] Filed: Jul. 24, 1996

[51] Int. Cl.$^6$ ............................ G09B 23/06; A63H 27/22
[52] U.S. Cl. ........................ 434/300; 446/58; 446/59
[58] Field of Search ........................ 446/57, 58, 59, 446/60, 61; 434/300, 302

[56] References Cited

U.S. PATENT DOCUMENTS

| | | | |
|---|---|---|---|
| 1,010,585 | 12/1911 | Carter | 446/59 |
| 1,507,192 | 8/1924 | Laukandt | 446/60 |
| 1,803,469 | 5/1931 | Gardner | 446/60 |
| 1,995,447 | 3/1935 | Daniel | 446/59 |
| 2,100,590 | 11/1937 | Grady | 446/58 |
| 2,166,068 | 7/1939 | Hunt | 446/60 |
| 2,200,686 | 5/1940 | Beckman | 446/59 |
| 2,543,516 | 2/1951 | Walker | 446/59 |
| 3,057,113 | 10/1962 | Baker | 446/59 |
| 3,174,252 | 3/1965 | Sunray | 446/59 |
| 3,594,946 | 7/1971 | DeWitt, Jr. | 446/60 |

FOREIGN PATENT DOCUMENTS

| | | | |
|---|---|---|---|
| 433654 | 1/1912 | France | 446/59 |
| 625212 | 8/1927 | France | 446/59 |

Primary Examiner—Paul J. Hirsch
Attorney, Agent, or Firm—Reginald F. Roberts, Jr.

[57] ABSTRACT

A propeller-driven educational vehicle for teaching science, mathematics, technology, and research methodology. The educational vehicle includes a body, one pair of wheels at the front end of the body and a second pair of wheels at the front end of the body, and a number of interchangeable propellers of different sizes for attachment by means of a propeller shaft to the front end of the body. A rubber band connects the rear end of the body to the propeller shaft. Rotation of the propeller and the propeller shaft in one direction winds and tightens the rubber band, thus storing in the rubber band potential energy which is transformed into kinetic energy and causes the propeller and propeller shaft to rotate in the opposite direction as the rubber band unwinds and loosens, causing the vehicle to move at an acceleration and speed which are directly related to the size of the propeller, and illustrating the conversion of potential energy into kinetic energy.

12 Claims, 4 Drawing Sheets

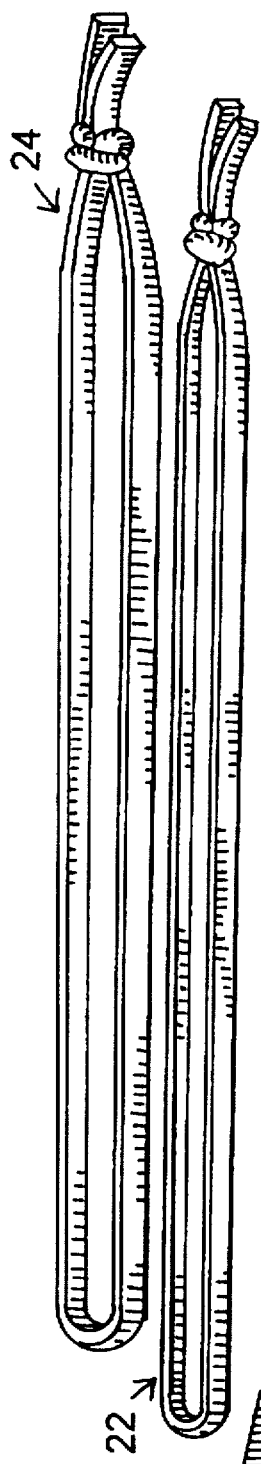
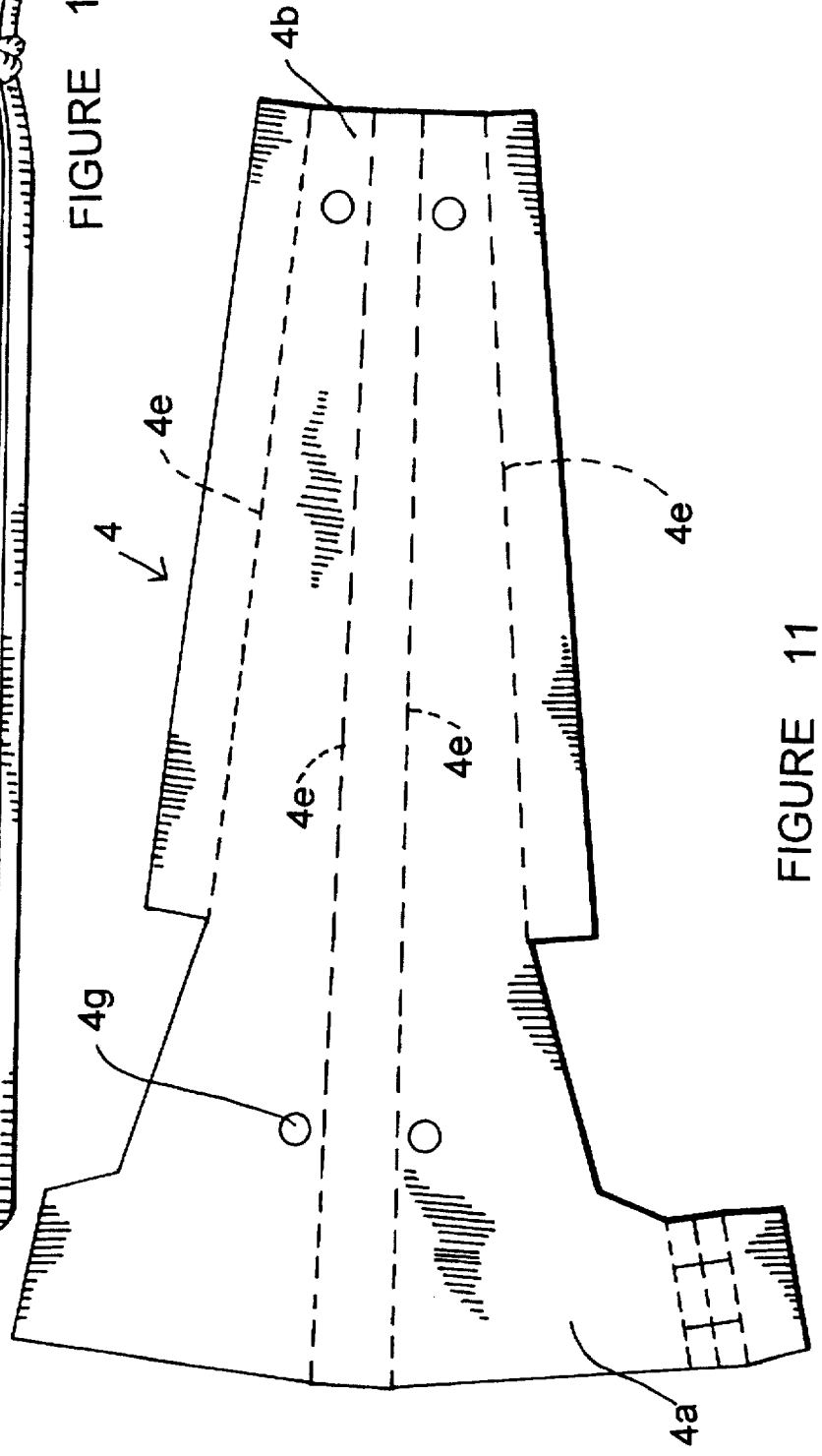

PROPELLER-DRIVEN EDUCATIONAL VEHICLE APPARATUS

BACKGROUND OF THE INVENTION

The present invention relates to education. More particularly, the invention relates to a mechanical device and method for teaching science, mathematics, technology, and research methodology.

The use of the present invention in the classroom accomplishes the following objectives:

(1) Teach and test the ability of students to follow, and if/as necessary, modify, instructions for designing and assembling a workable propeller-driven vehicle.

(2) Teach students to analyze the functioning of the vehicle and to find ways to enhance its performance.

(3) Explain how variables are selected and tested one-at-a-time, using appropriate controls in order for questions of design efficiency to be answered with precision.

The field of education has a pressing need for such a device and such a method. The present invention fulfills that need.

SUMMARY OF THE INVENTION

In general, the present invention in a first aspect provides an educational apparatus for teaching science, mathematics, technology, and research methodology. The apparatus comprises a body having first and second ends and a longitudinal axis; a first pair of wheels at the first end of the body; a second pair of wheels at the second end of the body; a plurality of propellers of different sizes; a rotatable propeller shaft having first and second ends; and an elastic member having first and second ends. The propellers are constructed and arranged for attachment to and detachment from the first end of the body; they teach and illustrate the relationship between independent and dependent variables. The propeller shaft is mounted to the first end of the body, and one of the propellers is attached to the first end of the propeller shaft. The first end of the elastic member is attached to the second end of the body, and the second end of the elastic member is attached to the second end of the propeller shaft, so that rotation of the propeller and the propeller shaft winds in a first direction and tightens the elastic member, thereby storing in the elastic member potential energy which is transformed into kinetic energy and causes the propeller and propeller shaft to rotate in a second and opposite direction as the elastic member unwinds and loosens, thereby moving the vehicle at an acceleration and speed which are directly related to the size of the propeller, which teaches and illustrates the principle of the conversion of potential energy into kinetic energy.

In a second aspect the invention provides a pedagogical method for instructing students in science, mathematics, technology, and research methodology. The method comprises (a) providing a body having first and second ends and a longitudinal axis; (b) providing a first pair of wheels at the first end of the body; (c) providing a second pair of wheels at the second end of the body; (d) providing a plurality of propellers of different sizes; (e) providing a rotatable propeller shaft having first and second ends; (f) attaching one of the propellers to the first end of the propeller shaft; (g) providing an elastic member having first and second ends; (h) connecting the first end of the elastic member to the second end of the body; (i) connecting the second end of the elastic member to the second end of the propeller shaft, thereby providing a propeller-driven vehicle; (j) rotating the propeller and propeller shaft in a first direction to wind and tighten the elastic member, thereby storing in the elastic member potential energy; and (k) releasing the propeller, thereby freeing the propeller and propeller shaft to rotate in a second and opposite direction as the elastic member unwinds and loosens, thereby moving the vehicle at an acceleration and speed which are directly related to the size of the propeller, thus teaching and illustrating the principle of the conversion of potential energy into kinetic energy. The different-sized propellers teach and illustrate the relationship between independent and dependent variables.

In a third aspect, the present invention provides a second pedagogical method for instructing students in science, mathematics, technology, and research methodology. The method comprises (a) providing a body having first and second ends and a longitudinal axis; (b) mounting a first pair of wheels at the first end of the body; (c) mounting a second pair of wheels at the second end of the body; (d) providing a plurality of propellers of different sizes; (e) providing a rotatable propeller shaft having first and second ends; (f) mounting the propeller shaft to the first end of the body; (g) connecting one of the propellers to the first end of the propeller shaft; (h) providing an elastic member having first and second ends; (i) connecting the first end of the elastic member to the second end of the body; (j) connecting the second end of the elastic member to the second end of the propeller shaft, thereby assembling a propeller-driven vehicle; (k) rotating the propeller and propeller shaft in a first direction, thereby winding and tightening the elastic member, and storing in the elastic member potential energy; and (l) releasing the propeller, whereby the potential energy in the elastic member is transformed into kinetic energy, causing the propeller and propeller shaft to rotate in a second and opposite direction as the elastic member unwinds and loosens, thereby moving the vehicle at an acceleration and speed which are directly related to the size of the propeller, thus teaching and illustrating the principle of the conversion of potential energy into kinetic energy. The different-sized propellers teach and illustrate the relationship between independent and dependent variables.

BRIEF DESCRIPTION OF THE DRAWINGS

FIG. 10 is a plan view of two elastic members having different degrees of elasticity, made in accordance with the principles of the present invention.

FIG. 11 is a plan view of a portion of the educational vehicle shown in FIGS. 1–4.

DETAILED DESCRIPTION OF THE INVENTION

Figure 1:
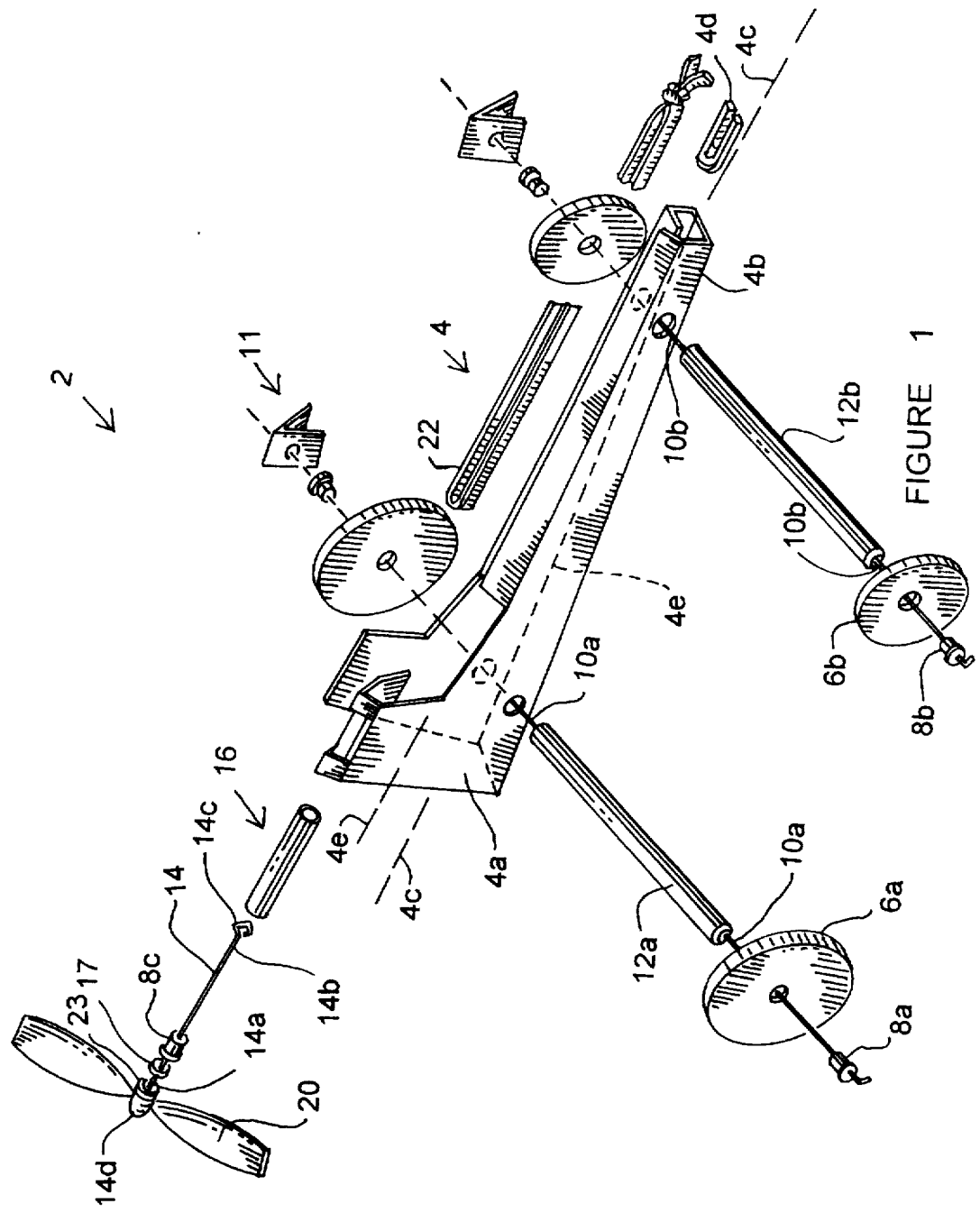
FIG. 1 is an exploded view of a propeller-driven educational vehicle, made in accordance with the principles of the present invention.

More specifically, reference is made to FIGS. 1–4, in which is shown a propeller-driven educational vehicle made in accordance with the principles of the present invention, and generally designated by the numeral 2.

The educational vehicle 2 comprises a tubular body 4 having first and second ends 4a and 4b, respectively, and a longitudinal axis 4c. A first pair of wheels 6a and a first pair of hubs 8a are mounted on a first axle 10a disposed coaxially in a first axle-support tube 12a at the first end 4a of the body 4. A second pair of wheels 6b and a second pair of hubs 8b are mounted on a second axle 10b disposed coaxially in a second axle-support tube 12b at the second end 4b of the body 4. The hubs 8a, 8b are secured to the axles 10a, 10b on one end by a right-angle bend in the axles 10a, 10b, and on the opposite end by a locking device 11.

A rotatable propeller shaft 14 is disposed in a propeller tube 16. A propeller 20 is attached to a first end 14a of the propeller shaft 14, and a fifth hub 8c is disposed between the propeller 20 and the propeller tube 16. The propeller 20 is held in place on the first end 14a of the propeller shaft 14 by a terminal hook 14c. Between the propeller 20 and the fifth hub 8c may be placed washers or perforated beads 17.

Figure 5:
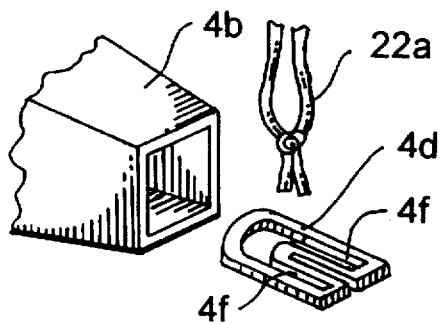
FIG. 5 is an enlarged view of a portion of the educational vehicle shown in FIGS. 1-4.
Figure 6:
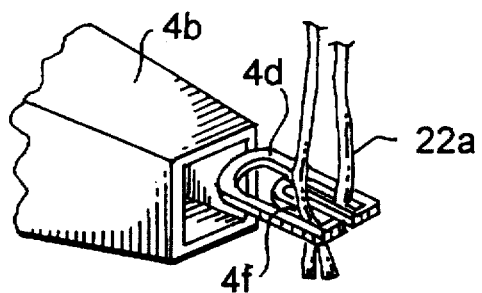
FIG. 6 is an enlarged view of a portion of the educational vehicle shown in FIGS. 1-4.
Figure 7:
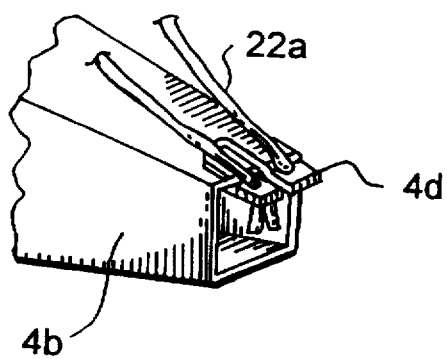
FIG. 7 is an enlarged view of a portion of the educational vehicle shown in FIGS. 1-4.
Figure 8:
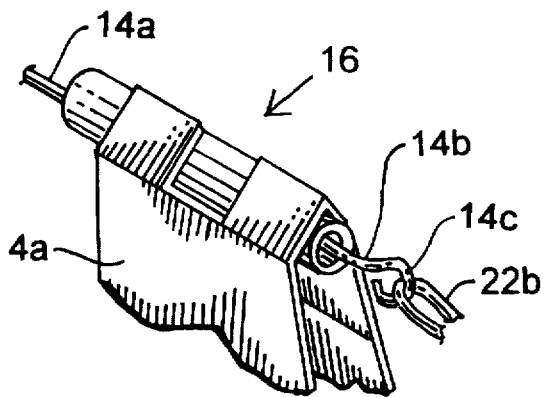
FIG. 8 is an enlarged view of a portion of the educational vehicle shown in FIGS. 1-4.

A first end 22a of a first elastic member 22 is attached to the second end 4b of the body 4, as shown in FIGS. 5–7, and a second end 22b of the first elastic member 22 is attached to a second end 14b of the propeller shaft 14 by disposing the second end 22b of the first elastic member 22 in a loop 14d at the second end 14b of the propeller shaft 14, as shown in FIG. 8. The first end 22a of the first elastic member 22 is secured to the second end 4b of the body 4 by disposing the first end 22a of the first elastic member 22 in a pair of openings 4f in a plate 4d at the second end 4b of the body 4.

Figure 2:
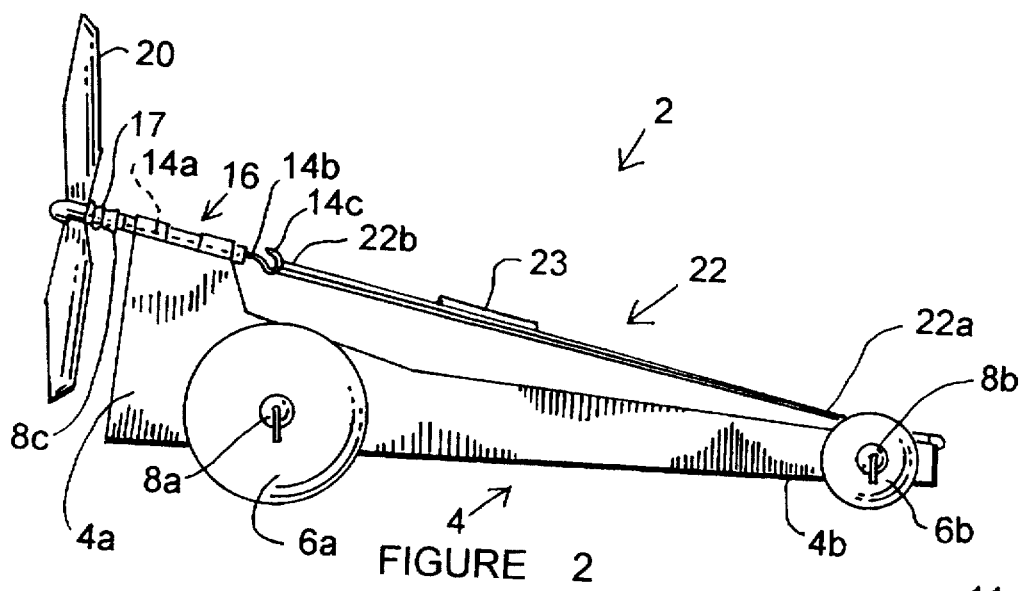
FIG. 2 is a side view of the educational vehicle shown in FIG. 1.
Figure 3:
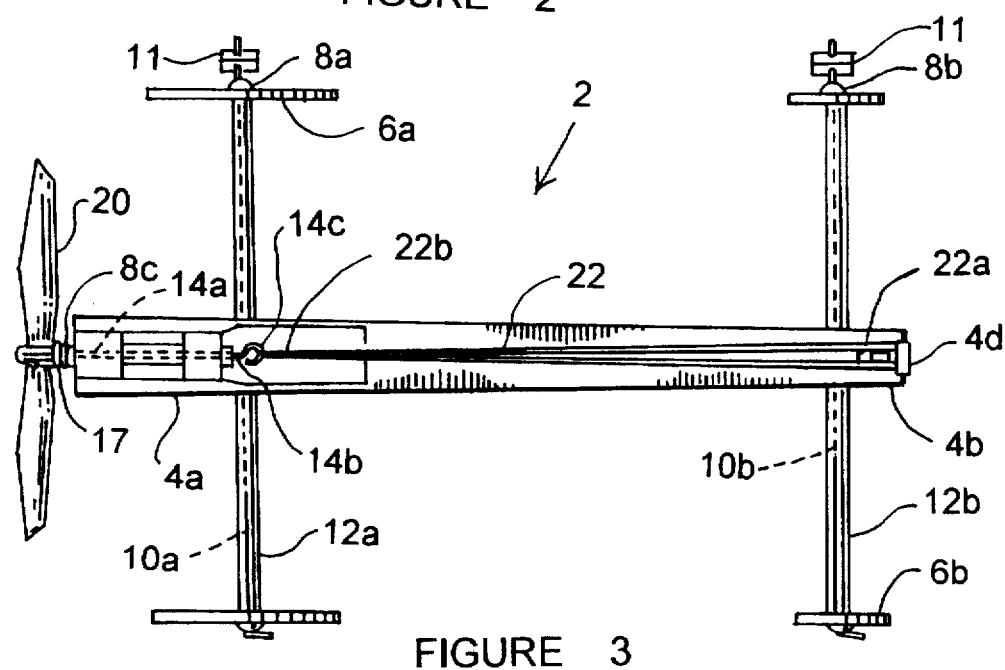
FIG. 3 is a top view of the educational vehicle shown in FIG. 1.
Figure 4:
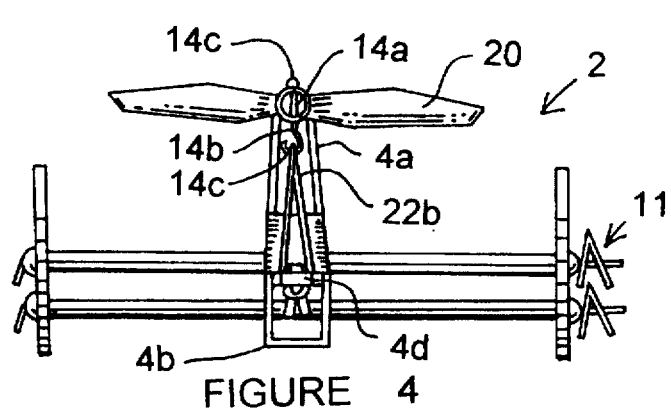
FIG. 4 is a front view of the educational vehicle shown in FIG. 1.

In order to illustrate the effect of friction, a coating of a lubricant 23 is applied to the surface of the first elastic member 22, as shown in FIG. 2, after the first elastic member 22 has been used without the coating of lubricant 23, and the first elastic member 22 is again used to energize and propel the educational vehicle 2.

In order further to illustrate the effect of friction, a lubricant 23 is applied to the surfaces of the propeller 20, the propeller shaft 14, and the fifth hub 8c, by placing a drop of lubricant 23 at the spot where the propeller shaft 14 emerges from the fifth hub 8c, after the educational vehicle 2 has been used without lubricating the propeller 20 and the fifth hub 8c, and the educational vehicle 2 is again mobilized.

In order still further to illustrate the effect of friction, a perforated bead 17 is inserted and disposed, or a plurality of perforated beads 17 are inserted and disposed, between the propeller 20 and the fifth hub 8c, as shown in FIG. 1, after the educational vehicle 2 has been used without the bead or beads 17, and the educational vehicle 2 is again mobilized. The perforated bead 17 is preferably shaped like a doughnut.

Figure 9:
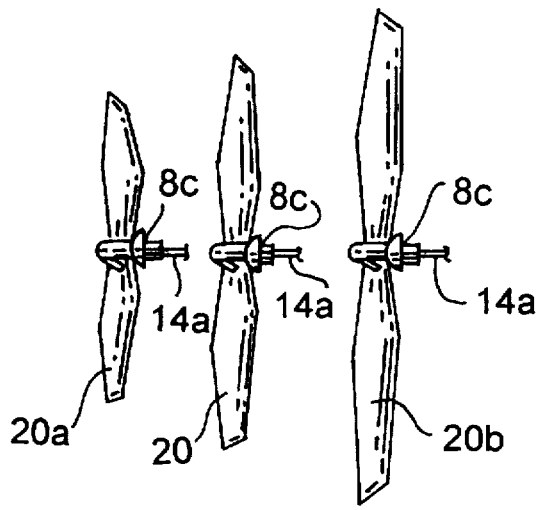
FIG. 9 is a plan view of three propellers of different sizes, made in accordance with the principles of the present invention.

Reference is now made to FIG. 9. In order to exemplify the relationship between independent and dependent variables, a plurality of interchangeable propellers 20, 20a, and 20b are provided. By varying the size of the propeller, e.g., by varying the length of the propeller, the student is readily taught the difference between an independent variable; e.g., the size or length of the propeller, and a dependent variable; e.g., the acceleration and speed of the propelled vehicle 4.

Reference is now made to FIG. 10, in which are shown first and second elastic members 22 and 24, respectively, it being understood that the first and second elastic members 22 and 24 differ in their degree of elasticity. Use of the first elastic member 22, followed by substitution and use of the second elastic member 24, clearly demonstrates the effect of elasticity on the performance of the educational vehicle 4. Preferably, the first and second elastic members 22, 24 are made of rubber. Even more preferably, the first and second elastic members 22, 24 are rubber bands having the same length but having different cross-sectional areas. Most preferably, the rubber bands 22, 24 have cross-sectional areas having a ratio of about two to one with respect to one another.

Preferably and very advantageously for interchangeability, economical fabrication, and ease of assembly, the body 4 is unitary, consisting of a single piece of material. Even more preferably, the body 4 is a single piece of material made by injection-molding. Most preferably, the body 4 is a single piece of plastic made by injection-molding.

Preferably the bead 17 is a glass or plastic bead.

The first and second axles 10a, 10b and the first and second axle-support tubes 12a, 12b are mounted and disposed coplanar with one another and perpendicular to the longitudinal axis 4c of the body 4. Preferably, the axles 10a and 10b are made of wire and are interchangeable; and the body 4, the propellers 20, 20a, 20b, the axle-support tubes 12a, 12b, the hubs 8a, 8b, and the wheels 6a and 6b are made of plastic by injection-molding, and are interchangeable. The fifth hub 8c and the propeller 20 are made of different materials having different melting points, thereby preventing fusion of the one to the other.

In the preferred embodiment of the present invention, the first pair of wheels 6a are larger than the second pair of wheels 6b, whereby the first end 4a of the body 4 is elevated above the second end 4b of the body 4. Even more preferably, the propeller 20, 20a, or 20b is wound in a direction which causes the educational vehicle 2 to move in a direction such that the second end 4b of the body 4 becomes the leading front end of the educational vehicle 2, thereby preventing damage to the propeller 20 in the event of a collision of the vehicle 2 with a foreign object.

Although the vehicle 2 can function as an educational vehicle in virtually any size, the vehicle 2 is preferably miniature. Thus, the overall length of the body 4 is preferably from about six inches to about eighteen inches. Even more preferably, the length of the body 4 is from about ten inches to about fourteen inches. Preferably, the length of the propeller 20 is from about four inches to about seven inches.

Although, as previously stated, the preferred embodiment of the invention comprises a plastic body 4, it is also possible to achieve pedagogical objectives by making the body 4 of stiff paper or cardboard, as well as of other light, rigid materials. To illustrate this possibility, reference is made to FIG. 11, in which is shown a body 4 made of stiff paper or cardboard, apertures 4g for disposal therein of the axle support tubes 12a, 12b, and fold lines 4e (shown also in FIG. 1) being as shown.

I claim:

1. An educational apparatus for teaching science, mathematics, technology, and research methodology, the apparatus comprising: a propeller-driven vehicle which includes (a) a body having first and second ends and a longitudinal axis;

(b) a first pair of wheels at the first end of the body;

(c) a second pair of wheels at the second end of the body;

(d) a plurality of propellers of different sizes, constructed and arranged for attachment to and detachment from the first end of the body, for teaching and illustrating the relationship between independent and dependent variables;

(e) a rotatable propeller shaft having first and second ends, mounted to the first end of the body, one of the propellers being attached to the first end of the propeller shaft;

(f) an elastic member having first and second ends, the first end of the elastic member being attached to the second end of the body, and the second end of the elastic member being attached to the second end of the propeller shaft, whereby rotation of the propeller and the propeller shaft in a first direction winds and tightens the elastic member, thereby storing in the elastic member potential energy which is transformed into kinetic energy and which causes the propeller and propeller shaft to rotate in a second and opposite direction as the elastic member unwinds and loosens, thereby moving the vehicle at an acceleration and speed which are directly related to the size of the propeller, and teaching and illustrating the principle of the conversion of potential energy into kinetic energy.

2. The apparatus of claim 1, further comprising:

(g) a propeller tube in which the propeller shaft is disposed; and (h) a hub disposed between the propeller and the propeller tube.

3. The apparatus of claim 2, further comprising:

(i) a bead disposed between the propeller and the hub, for teaching and illustrating the principles and laws of friction.

4. The apparatus of claim 1, further comprising:

(g) a first axle-support tube having first and second ends, mounted on the first end of the body perpendicular to the longitudinal axis of the body;

(h) a second axle-support tube having first and second ends, coplanar with the first axle-support tube, mounted on the second end of the body perpendicular to the longitudinal axis of the body;

(i) a first axle having first and second ends, disposed coaxially in the first axle-support tube perpendicular to the longitudinal axis of the body;

(j) a second axle having first and second ends, disposed coaxially in the second axle-support tube perpendicular to the longitudinal axis of the body;

(k) a first pair of hubs mounted on the the first and second ends of first axle, the first pair of wheels being mounted on the first pair of hubs; and (l) a second pair of hubs mounted on the first and second ends of the second axle, the second pair of wheels being mounted on the second pair of hubs.

5. The apparatus of claim 4, wherein:

(m) the body is tubular;

(n) the body, the propeller, the axle-support tubes, the hubs, and the wheels are made of plastic by injection-molding and are interchangeable; and (o) the axles and the propeller shaft are made of wire and are interchangeable.

6. The apparatus of claim 1, further comprising:

(g) a second elastic member having a different elasticity than that of the first elastic member, for teaching and illustrating the principle of elasticity.

7. The apparatus of claim 1, wherein the elastic member is coated with a lubricant, for teaching and illustrating the principles and laws of friction.

8. The apparatus of claim 2, wherein the propeller and hub are lubricated, for teaching and illustrating the principles and laws of friction.

9. A pedagogical method for instructing students in science, mathematics, technology, and research methodology, the method comprising the steps of:

(a) providing a body having first and second ends and a longitudinal axis;

(b) providing a first pair of wheels at the first end of the body;

(c) providing a second pair of wheels at the second end of the body;

(d) providing a plurality of propellers of different sizes, for teaching and illustrating the relationship between independent and dependent variables;

(e) providing a rotatable propeller shaft having first and second ends;

(f) attaching one of the propellers to the first end of the propeller shaft;

(g) providing an elastic member having first and second ends;

(h) connecting the first end of the elastic member to the second end of the body;

(i) connecting the second end of the elastic member to the second end of the propeller shaft, thereby providing a propeller-driven vehicle;

(j) rotating the propeller and the propeller shaft in a first direction to wind and tighten the elastic member, thereby storing in the elastic member potential energy; and (k) releasing the propeller, thereby freeing the propeller and propeller shaft to rotate in a second and opposite direction as the elastic member unwinds and loosens, thereby moving the vehicle at an acceleration and speed which are directly related to the size of the propeller, and teaching and illustrating the principle of the conversion of potential energy into kinetic energy.

10. The method of claim 9, further comprising the steps of:

(l) providing a propeller tube;

(m) disposing the propeller shaft in the propeller tube;

(n) repeating step (j);

(o) repeating step (k);

(p) inserting and disposing a bead between the propeller and the hub;

(q) repeating step (j); and (r) repeating step (k);

thereby teaching and illustrating the principles and laws of friction.

11. A pedagogical method for instructing students in science, mathematics, technology, and research methodology, the method comprising the steps of:

(a) providing a body having first and second ends and a longitudinal axis;

(b) mounting a first pair of wheels at the first end of the body;

(c) mounting a second pair of wheels at the second end of the body;

(d) providing a plurality of propellers of different sizes, for teaching and illustrating the relationship between independent and dependent variables;

(e) providing a rotatable propeller shaft having first and second ends;

(f) mounting the propeller shaft to the first end of the body;

(g) connecting one of the propellers to the first end of the propeller shaft;

(h) providing an elastic member having first and second ends;

(i) connecting the first end of the elastic member to the second end of the body;

(j) connecting the second end of the elastic member to the second end of the propeller shaft, thereby assembling a propeller-driven vehicle;

(k) rotating the propeller and propeller shaft in a first direction, thereby winding and tightening the elastic member, and storing in the elastic member potential energy; and (l) releasing the propeller, whereby the potential energy in the elastic member is transformed into kinetic energy, causing the propeller and propeller shaft to rotate in a second and opposite direction as the elastic member unwinds and loosens, thereby moving the vehicle at an acceleration and speed which are directly related to the size of the propeller, and teaching and illustrating the principle of the conversion of potential energy into kinetic energy.

12. The method of claim 11, further comprising the steps of:

(m) providing a propeller tube;

(n) disposing the propeller shaft in the propeller tube;

(o) repeating step (k);

(p) repeating step (l);

(q) inserting and disposing a bead between the propeller and the hub;

(r) repeating step (k); and (s) repeating step (l);

thereby teaching and illustrating the principles and laws of friction.

* * * * *